United States Patent
Punjabi

(10) Patent No.: US 10,831,986 B2
(45) Date of Patent: Nov. 10, 2020

(54) GENERATING A DOCUMENT OBJECT MODEL (DOM) DIFFERENTIAL

(71) Applicant: Acoustic, L.P., New York, NY (US)

(72) Inventor: Manoj Punjabi, Dublin, CA (US)

(73) Assignee: Acoustic, L.P., New York, NY (US)

( * ) Notice: Subject to any disclaimer, the term of this patent is extended or adjusted under 35 U.S.C. 154(b) by 110 days.

(21) Appl. No.: 16/002,612

(22) Filed: Jun. 7, 2018

(65) Prior Publication Data

US 2018/0285330 A1    Oct. 4, 2018

Related U.S. Application Data

(63) Continuation of application No. 15/178,807, filed on Jun. 10, 2016, now Pat. No. 10,025,762.

(51) Int. Cl.
*G06F 17/00* (2019.01)
*G06F 40/14* (2020.01)
*G06F 40/103* (2020.01)
*G06F 16/83* (2019.01)

(52) U.S. Cl.
CPC ............ *G06F 40/14* (2020.01); *G06F 40/103* (2020.01); *G06F 16/83* (2019.01)

(58) Field of Classification Search
CPC ........... G06F 17/2247; G06F 17/30923; G06F 17/24; G06F 40/14
See application file for complete search history.

(56) References Cited

U.S. PATENT DOCUMENTS

| | | | |
|---|---|---|---|
| 6,826,726 B2 | 11/2004 | Hsing et al. | |
| 9,298,850 B2 | 3/2016 | Benjamin et al. | |
| 2002/0023113 A1* | 2/2002 | Hsing | G06F 16/273 715/234 |
| 2004/0088652 A1* | 5/2004 | Abe | G06F 17/2211 715/230 |
| 2004/0268230 A1 | 12/2004 | Liu et al. | |
| 2015/0193399 A1* | 7/2015 | Woker | H04L 41/02 715/234 |
| 2015/0378971 A1 | 12/2015 | Fischer | |
| 2016/0088015 A1 | 3/2016 | Sivan et al. | |

OTHER PUBLICATIONS

"Cascading Style Sheets (CSS)," Mozilla Developer Network, copyright 2005-2016, accessed May 12, 2016, 1 page. https://developer.mozilla.org/en-US/docs/Web/CSS.

"CharacterData," Mozilla Developer Network, copyright 2005-2016, accessed May 17, 2016, 3 pages. https://developer.mozilla.org/en-US/docs/Web/API/CharacterData.

(Continued)

*Primary Examiner* — Andrew T McIntosh
(74) *Attorney, Agent, or Firm* — Mauriel Kapouytian Woods LLP; Lana Akopyan; Michael Mauriel

(57) ABSTRACT

Generating a document object model (DOM) differential is provided. In response to receiving a webpage, a snapshot is generated of a base DOM corresponding to the webpage. A DOM node change list corresponding to the base DOM is generated. A DOM node attribute change list corresponding to the base DOM is generated. The base DOM is monitored for changes. A DOM differential is generated for the base DOM based on DOM node entries in the DOM node change list and the DOM node attribute change list.

18 Claims, 8 Drawing Sheets

(56) References Cited

OTHER PUBLICATIONS

"Document Object Model (DOM)," Mozilla Developer Network, copyright 2005-2016, accessed May 12, 2016, 3 pages. https://developer.mozilla.org/en-US/docs/Web/API/Document_Object_Model.

Le Bras et al., "Patching Base Document Object Model (DOM) with DOM-Differentials to Generate High Fidelity Replay of Webpage User Interactions," U.S. Appl. No. 14/640,658, filed May 3, 2016, 32 pages.

Grace Period Disclosure: Yves Le Bras, Lalith K. Maddali, Manoj Punjabi, and Haixiao Yu, "DOM Capture and Replay," IBM Corporation, Tealeaf Customer Experience 9.0.2, Sep. 18, 2015, 3 pages. http://www.ibm.com/support/knowledgecenter/SS2MBL_9.0.2/cxImpactUser/UIC/UICj2CfgWiz/DOMCaptureAndReplay.dita?lang=en.

"MutationObserver," Mozilla Developer Network, copyright 2005-2016, accessed May 12, 2016, 2 pages. https://developer.mozilla.org/en-US/docs/Web/API/MutationObserver.

"XMLHttpRequest," Mozilla Developer Network, copyright 2005-2016, accessed May 12, 2016, 7 pages. https://developer.mozilla.org/en-US/docs/Web/API/XMLHttpRequest.

"XML Path Language (XPath)," Mozilla Developer Network, copyright 2005-2016, accessed May 17, 2016, 2 pages. https://developer.mozilla.org/en-US/docs/Web/XPath.

\* cited by examiner

GENERATING A DOCUMENT OBJECT MODEL (DOM) DIFFERENTIAL

CROSS-REFERENCE TO RELATED APPLICATION(S)

This application is a continuation of and claims the benefit of priority to U.S. patent application Ser. No. 15/178,807, filed on Jun. 10, 2016, and entitled "Generating a Document Object Model (DOM) Differential", the contents of which are incorporated herein by reference.

BACKGROUND

1. Field

The disclosure relates generally to a document object model (DOM) of a webpage and more specifically to generating a DOM differential of a base DOM corresponding to the webpage based on user and script interactions with the webpage.

2. Description of the Related Art

A DOM is a programming interface for hypertext markup language (HTML), extensible markup language (XML), and scalable vector graphics (SVG) documents, for example. The DOM provides a structured representation of these documents as a tree. The DOM defines methods that allow access to the tree, so that the methods can change the document structure, style, and content. In addition, the DOM provides a representation of these documents as a structured group of nodes and objects, possessing various properties and methods. The nodes of a DOM tree can also have event handlers attached to them, and once an event is triggered, the event handlers get executed. Essentially, the DOM connects web pages to scripts or programming languages. Although the DOM is often accessed using JavaScript, the DOM is not a part of the JavaScript language and can also be accessed by other languages.

XML Path Language (XPath) can be used as a way of navigating through the DOM of any XML-like language document, such as HTML and XML user interface language (XUL), instead of relying on the methods, properties, and other DOM features. XPath uses a non-XML syntax to provide a flexible way of addressing (i.e., pointing to) different parts of an XML-like document. In addition, XPath can also be used to test addressed nodes within an XML-like document to determine whether nodes match a pattern or not. XPath uses a path notation (e.g., uniform resource locators (URLs)) for navigating through the hierarchical structure of an XML-like document. XPath uses the non-XML syntax so that the non-XML syntax can be used in uniform resource identifiers (URIs) and XML attribute values. Most web browsers support XPath.

SUMMARY

According to one illustrative embodiment, a computer-implemented method for generating a document object model (DOM) differential is provided. In response to a data processing system receiving a webpage, the data processing system generates a snapshot of a base DOM corresponding to the webpage. The data processing system generates a DOM node change list corresponding to the base DOM. The data processing system generates a DOM node attribute change list corresponding to the base DOM. The data processing system monitors the base DOM for changes. The data processing system generates a DOM differential for the base DOM based on DOM node entries in the DOM node change list and the DOM node attribute change list. According to other illustrative embodiments, a data processing system and computer program product for generating DOM differential are provided.

DETAILED DESCRIPTION

Figure 1:
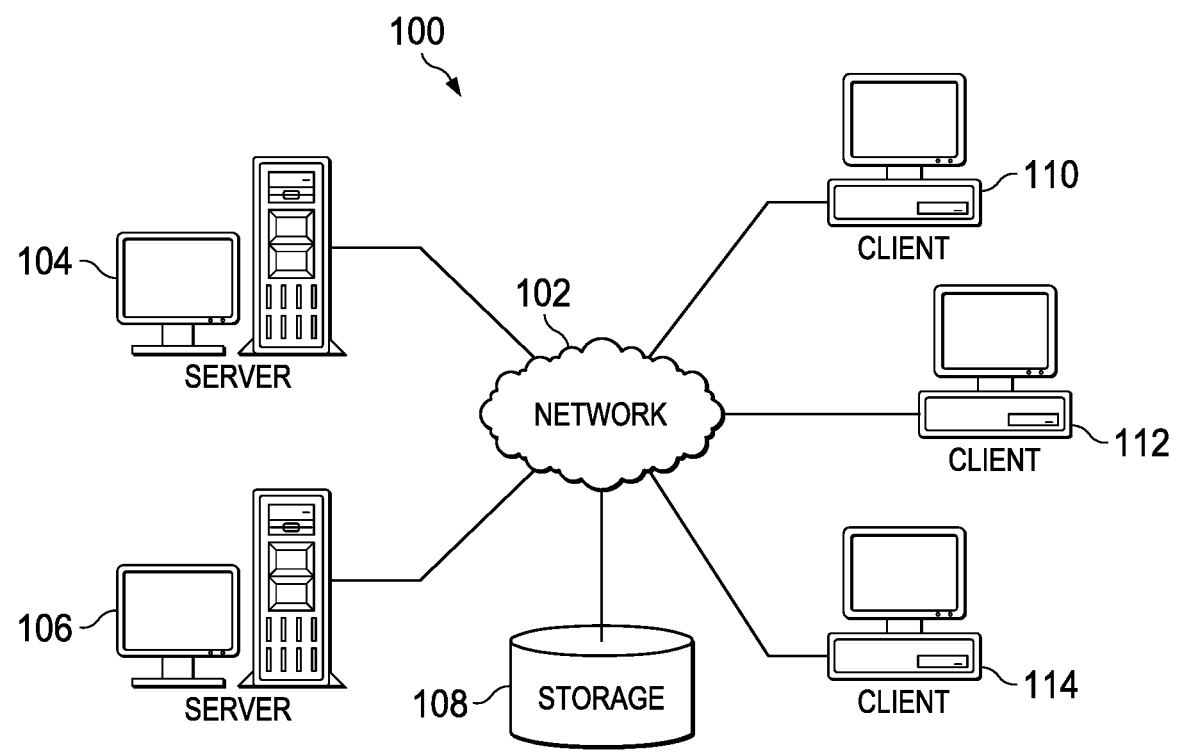
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
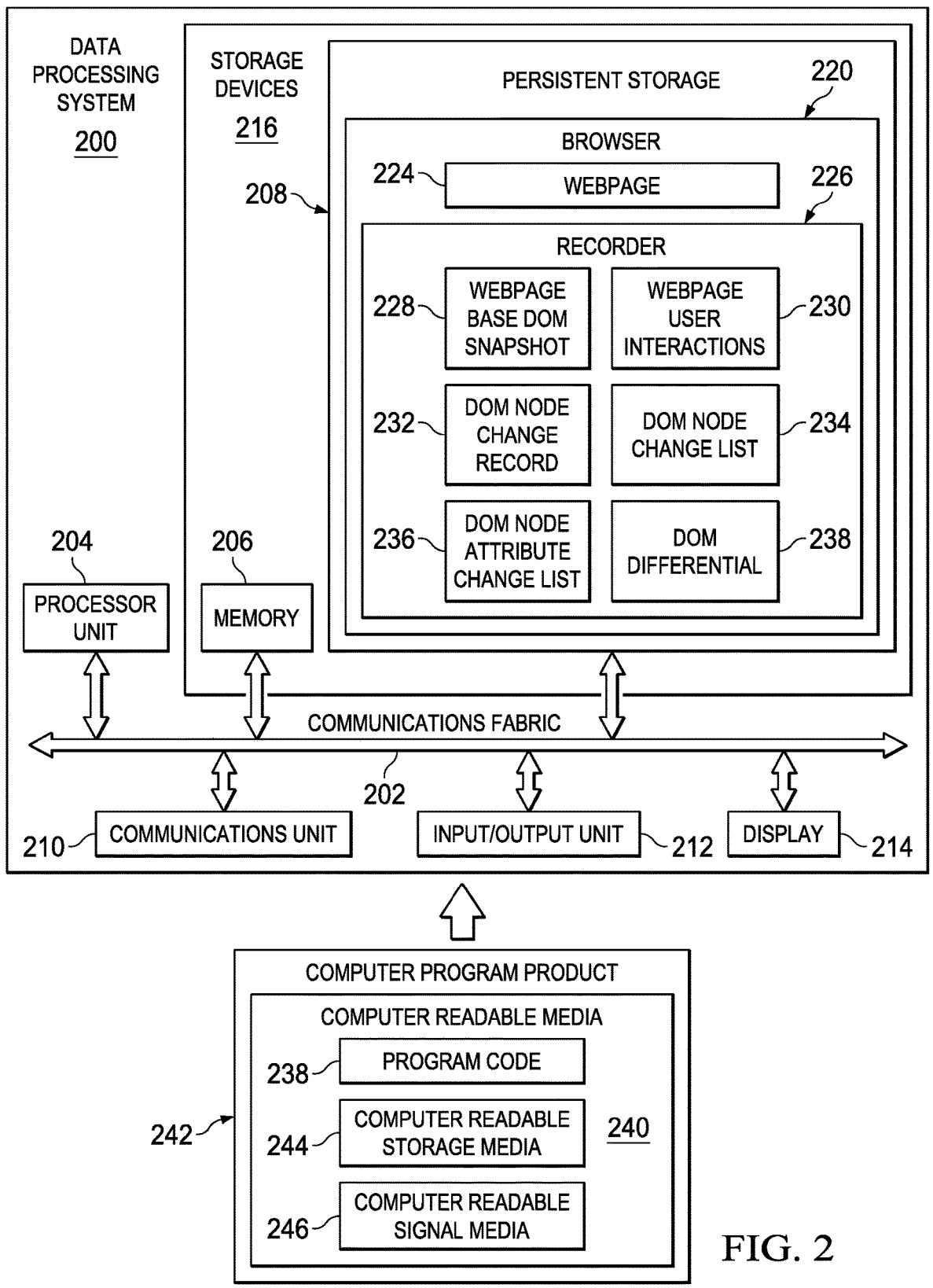
FIG. 2 is a diagram of a data processing system in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services to users of client devices. For example, server 104 and server 106 may host one or more web applications that provide web pages to requesting clients.

Client 110, client 112, and client 114 also connect to network 102. Clients 110, 112, and 114 are clients of server 104 and server 106. For example, a user of client 110 may request from server 104 a set of web pages corresponding to an enterprise, such as a banking institution, to perform a set of tasks, such as transferring funds between bank accounts owned by the user. Further, server 104 and server 106 may provide information, such as boot files, operating system images, and software applications to clients 110, 112, and 114.

In this example, clients 110, 112, and 114 are illustrated as desktop computers, which may have wire or wireless communication links to network 102. However, it should be noted that clients 110, 112, and 114 are intended as examples only. In other words, clients 110, 112, and 114 also may include other devices, such as, for example, laptop computers, handheld computers, smart phones, smart watches, personal digital assistants, gaming devices, set-top boxes, kiosks, or any combination thereof.

Storage 108 is a network storage device capable of storing any type of data in a structured format or an unstructured format. In addition, storage 108 may represent a set of one or more network storage devices. Storage 108 may store, for example, names and identification numbers for a plurality of different users accessing restricted services provided by different web pages, session identifiers corresponding to the web pages, and the like. Further, storage 108 may store other data, such as authentication or credential data that may include user names, passwords, and biometric data associated with the plurality of different users and system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a data processing system, such as client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores browser 220. Browser 220 is a web browser software application for retrieving, presenting, and traversing information resources, such as web pages, on the World Wide Web (WWW). Browser 220 includes webpage 224 and recorder 226. Webpage 224 represents any web document suitable for the WWW and browser 220. Browser 220 displays webpage 224 in display 214. Webpage 224 is typically written in XML, HTML, or other similar markup language.

Recorder 226 is capable of generating webpage base DOM snapshot 228 and recording webpage user interactions 230. Webpage base DOM snapshot 228 represents an initial snapshot of a base DOM corresponding to webpage 224 after webpage 224 is fully loaded on browser 220. A DOM is a cross-platform and language-independent convention for representing and interacting with objects in HTML, extensible hypertext markup language (XHTML), and XML documents corresponding to web pages. Nodes of a markup language document are organized in a tree structure known as a DOM tree. Objects in the DOM tree may be addressed and manipulated by using methods on the objects. Webpage user interactions 230 represent activities or events performed by a user of data processing system 200 on webpage 224 during a session. A user interaction with webpage 224 may be, for example, scrolling of webpage 224 using a mouse wheel or slider bar, activation of a link embedded in webpage 224 using a mouse click, entering textual data in a field of webpage 224 using a keypad or keyboard, dragging and dropping an item on webpage 224 using touch screen inputs, gestures, and the like.

Recorder 226 also is capable of recording DOM node change record 232. DOM node change record 232 represents a plurality of different DOM node change records. DOM node change record 232 may include, for example, identification of a target DOM node of a particular DOM change, the type of DOM node change, and other related DOM node change data. Further, recorder 226 also is capable of generating DOM node change list 234 and DOM node attribute change list 236. DOM node change list 234 may include, for example, entries for each DOM node change, along with XPaths of corresponding target nodes of a DOM change and lists of DOM nodes added and removed as a result of the DOM change. DOM node attribute change list 236 may include, for example, entries for each DOM node attribute change, along with XPaths of corresponding target nodes of a DOM attribute change and a set of entries for each attribute change to a target node.

Furthermore, recorder 226 is capable of generating DOM differential 238 of webpage base DOM 228 corresponding to webpage 224 by consolidating a minimal set of DOM node and attribute changes recorded in DOM node change list 234 and DOM node attribute change list 236. DOM differential 238 represents a set of changes or deltas to webpage base DOM 228 caused by webpage script and user interactions 230 with webpage 224 during a session.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. The user may utilize the input device to interact with webpage 224. Display 214 provides a mechanism to display information, such as, for example, webpage 224, to the user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that a way to generate a DOM differential from a base DOM of a webpage based on user interactions with the webpage did not currently exist. Illustrative embodiments generate a minimal set of differentials (i.e., differences/changes/modifications) between two DOM states of a webpage. The capability to generate a DOM differential is an improvement over existing DOM capture solutions, which only describe how to capture a full DOM snapshot.

Given a base DOM corresponding to a webpage, certain changes or modifications are made to the webpage over a period of time, which results in a new DOM corresponding to the webpage. The changes or modifications to the base DOM may be a result of various user interactions, JavaScript, XMLHttpRequest (XHR), or Cascading Style Sheet (CSS) related changes or any such programmable actions.

JavaScript is a high-level, dynamic, untyped, and interpreted programming language. Along with HTML and CSS, JavaScript is one of the three core technologies of World Wide Web content production. The majority of websites employ JavaScript and JavaScript is supported by most web browsers.

XMLHttpRequest is an application programming interface (API) that provides client functionality for transferring data between a client and a server. XMLHttpRequest provides a way to retrieve data from a URL without having to do a full page refresh. This enables a webpage to update just a part of the webpage without disrupting what the user is doing. Despite its name, XMLHttpRequest can be used to retrieve any type of data, not just XML, and it supports protocols other than hypertext transfer protocol (HTTP).

CSS is a stylesheet language used to describe the presentation of a document written in HTML or XML (including XML dialects like SVG or XHTML). CSS describes how elements should be rendered on screen, on paper, in speech, or on other media. CSS is one of the core languages of the World Wide Web.

Utilizing a mechanism to observe each of these DOM changes, such as, for example, a MutationObserver API, illustrative embodiments identify the minimal set of DOM node and attribute changes, which when applied to the base DOM produce the new DOM. The MutationObserver API provides a way to react to changes in a DOM. The minimal set of such DOM node and attribute changes is referred to as the DOM differential. Illustrative embodiments generate the DOM differential by first capturing a base DOM of a requested webpage by, for example, taking a snapshot of the initial DOM corresponding to the requested webpage. Then, illustrative embodiments monitor for all changes to the base DOM. Illustrative embodiments record each change to the base DOM as a DOM change record. The exact mechanism whereby illustrative embodiments identify and monitor the DOM changes may vary depending on different illustrative embodiments. For example, illustrative embodiments may utilize a recorder in the web browser to identify, monitor, and record the DOM changes.

Illustrative embodiments may split the DOM change records into two different sets of changes depending on the type of change. The DOM change types may include, for example, DOM node insertion and removal, DOM node character data changes, and DOM node attribute changes. DOM node character data changes represent a variation of a DOM node object. Character data represent a node object that contains characters. In other words, character data represent a DOM string representing textual data contained within the node object.

Illustrative embodiments place the DOM changes related to DOM node insertion/removal and DOM node character data change types in a first list of DOM node changes. Illustrative embodiments generate the list of DOM node changes by generating a list of DOM nodes that were added as a result of a DOM change to a target node corresponding to a DOM change record. In addition, illustrative embodiments generate a list of DOM nodes that were removed as a result of the DOM change to the target node corresponding to that same DOM change record. Further, illustrative embodiments calculate an XPath of the target node corresponding to the DOM change. An XPath is a unique path from a modified DOM node up to a root node of the DOM tree.

Then, illustrative embodiments determine whether the list of DOM node changes already contains an existing entry for the target node corresponding to the DOM change by comparing the XPath of the target node with XPaths of each entry in the list of DOM node changes. If an entry containing the XPath of the target node corresponding to the DOM change does not already exist in the list of DOM node changes, then illustrative embodiments generate a new entry in the list of DOM node changes for the target node that includes the XPath of the target node, the list of DOM nodes that were added as a result of the DOM change to the target node, and the list of DOM nodes that were removed as a result of the DOM change to the target node.

If an entry containing the XPath of the target node corresponding to the DOM change already exists in the list of DOM node changes, then illustrative embodiments merge the list of DOM nodes that were added as a result of the DOM change to the target node into the already existing entry. In addition, illustrative embodiments determine whether any DOM nodes in the list of DOM nodes that were removed as a result of the DOM change to the target node match any DOM nodes in the merged list of added DOM nodes. If a DOM node in the list of DOM nodes that were removed as a result of the DOM change to the target node matches a DOM node in the merged list of added DOM nodes, then illustrative embodiments delete those matching DOM nodes from the list of DOM nodes that were removed as a result of the DOM change to the target node and from the merged list of added DOM nodes. Further, illustrative embodiments merge the list of remaining DOM nodes that were removed as a result of the DOM change to the target node into the already existing entry. Furthermore, illustrative embodiments determine whether any DOM nodes exist in the merged lists of DOM nodes that were added and removed as a result of the DOM change to the target node. If both merged lists are empty, then illustrative embodiments delete the merged lists from the list of DOM node changes.

Illustrative embodiments place the DOM changes related to DOM node attribute changes in a second list of DOM node attribute changes. Illustrative embodiments generate the list of DOM node attribute changes by generating an entry containing the DOM node attribute name corresponding to the target node of the DOM node attribute change, the old value of the attribute, and the current value of the attribute. In addition, illustrative embodiments calculate an XPath of the target node corresponding to the DOM node attribute change. It should be noted that multiple attributes may exist for a DOM node and consequently multiple attribute changes may exist for any given DOM node.

Afterward, illustrative embodiments determine whether the list of DOM node attribute changes already contains an existing entry for the target node corresponding to the DOM node attribute change by comparing the XPath of the target node with XPaths of each entry in the list of DOM node attribute changes. If an entry containing the XPath of the target node corresponding to the DOM node attribute change does not already exist in the list of DOM node attribute changes, then illustrative embodiments generate a new entry in the list of DOM node attribute changes for the target node that includes the XPath of the target node, the DOM node attribute name, the old value of the attribute, and the current value of the attribute.

If an entry containing the XPath of the target node corresponding to the DOM change already exists in the list of DOM node attribute changes, then illustrative embodiments determine whether the DOM node attribute name is already present in the existing entry. If the DOM node attribute name is not already present in the existing entry, then illustrative embodiments add the DOM node attribute name, old value of the attribute, and current value of the attribute to the existing entry. If the DOM node attribute name is already present in the existing entry, then illustrative embodiments determine whether the current attribute value matches the old attribute value in the existing entry. If the current attribute value matches the old attribute value in the existing entry, then illustrative embodiments delete the attribute from the existing entry. If the current attribute value does not match the old attribute value in the existing entry, then illustrative embodiments update the existing entry with the current attribute value. If no attribute characteristics (i.e., DOM node attribute name, old attribute value, and current attribute value) remain in the existing entry, then illustrative embodiments delete the existing entry from the list of DOM node attribute changes.

Illustrative embodiments generate the DOM differential by first traversing all entries in the first list of DOM node changes and deleting any entry that refers to a DOM node whose ancestor also is in the first list of DOM node changes. Illustrative embodiments may accomplish this by comparing XPaths of each of the DOM node entries in the list of DOM node changes. Second, illustrative embodiments traverse all entries in the second list of DOM node attribute changes and delete any entry that refers to a DOM node that also is in the first list of DOM node changes and delete any entry that refers to a DOM node whose ancestor also is in the first list of DOM node changes. Illustrative embodiments may accomplish this by comparing XPaths of entries in both lists. Then, illustrative embodiments generate the DOM differential by combining and serializing the minimal set of DOM node and attribute changes represented by the set of DOM nodes remaining in the first list of DOM node changes and the second list of DOM node attribute changes.

Figure 3:
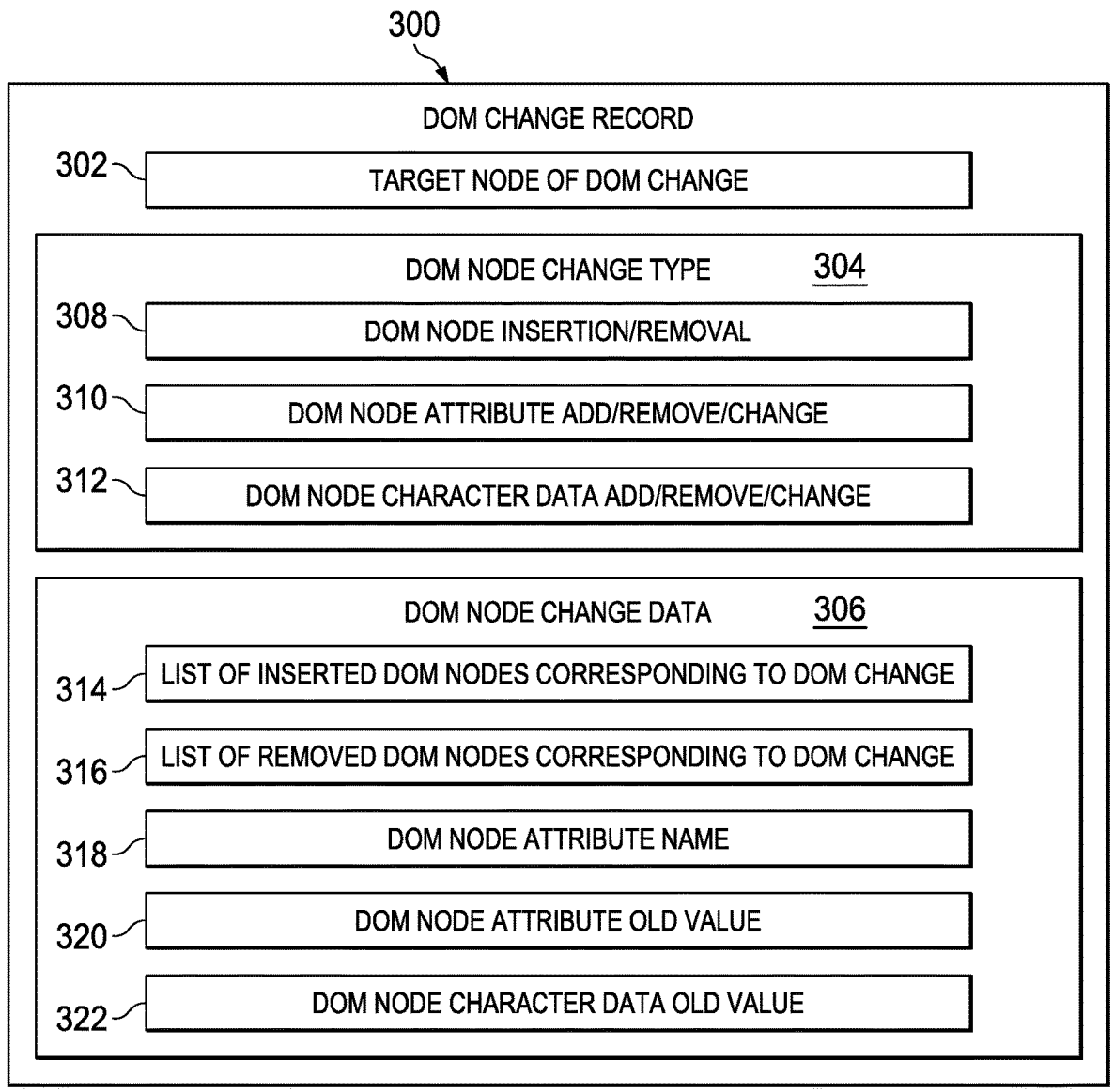
FIG. 3 is a diagram illustrating an example of a DOM change record in accordance with an illustrative embodiment.

With reference now to FIG. 3, a diagram illustrating an example of a DOM change record is depicted in accordance with an illustrative embodiment. DOM change record 300 may be, for example, DOM change record 232 in FIG. 2. In this example, DOM change record 300 includes target node of DOM change 302, DOM node change type 304, and DOM node change data 306. However, it should be noted that DOM change record 300 may include more or less information than illustrated depending on different illustrative embodiments.

Target node of DOM change 302 identifies the DOM node that is the target of a change to a base DOM snapshot of a webpage, such as webpage base DOM snapshot 228 in FIG. 2. DOM node change type 304 identifies a type of change that occurred to target node of DOM change 302. DOM node change type 304 includes DOM node insertion/removal 308, DOM node attribute add/remove/change 310, and DOM node character data add/remove/change 312.

DOM node change data 306 includes list of inserted DOM nodes corresponding to DOM change 314, list of removed DOM nodes corresponding to DOM change 316, DOM node attribute name 318, DOM node attribute old value 320, and DOM node character data old value 322.

List of inserted DOM nodes corresponding to DOM change 314 identifies DOM nodes that were added to a base DOM as a result of the change to target node of DOM change 302. List of removed DOM nodes corresponding to DOM change 316 identifies DOM nodes that were deleted from the base DOM as a result of the change to target node of DOM change 302. DOM node attribute name 318 identifies a name of an attribute that was changed as a result of the change to target node of DOM change 302. DOM node attribute old value 320 identifies an old value of the attribute that was changed as a result of the change to target node of DOM change 302. DOM node character data old value 322 identifies an old value of the character data that was changed as a result of the change to target node of DOM change 302.

Figure 4:
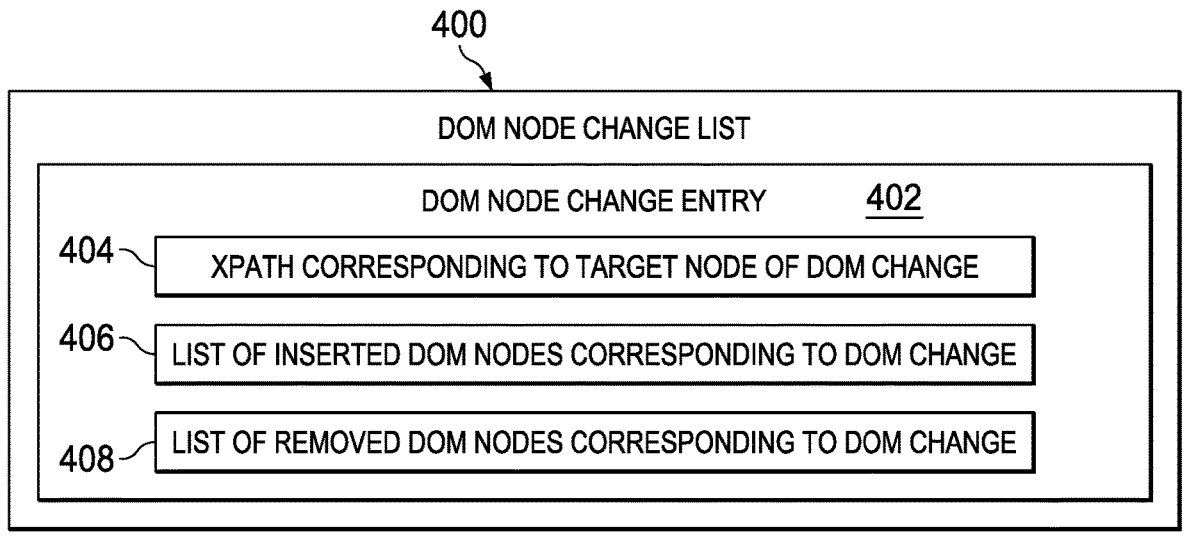
FIG. 4 is a diagram illustrating an example of a DOM node change list in accordance with an illustrative embodiment.

With reference now to FIG. 4, a diagram illustrating an example of a DOM node change list is depicted in accordance with an illustrative embodiment. DOM node change list 400 may be, for example, DOM node change list 234 in FIG. 2. DOM node change list 400 includes DOM node change entry 402. It should be noted that DOM node change entry 402 represents a plurality of DOM node change entries in DOM node change list 400.

DOM node change entry 402 includes XPath corresponding to target node of DOM change 404, list of inserted DOM nodes corresponding to DOM change 406, and list of removed DOM nodes corresponding to DOM change 408. XPath corresponding to target node of DOM change 404 identifies the unique XPath corresponding to the DOM node that is the target of the change to the base DOM. List of inserted DOM nodes corresponding to DOM change 406 identifies each of the DOM nodes that were added to the base DOM as a result of the change. List of removed DOM nodes corresponding to DOM change 408 identifies each of the DOM nodes that were deleted from the base DOM as a result of the change.

Figure 5:
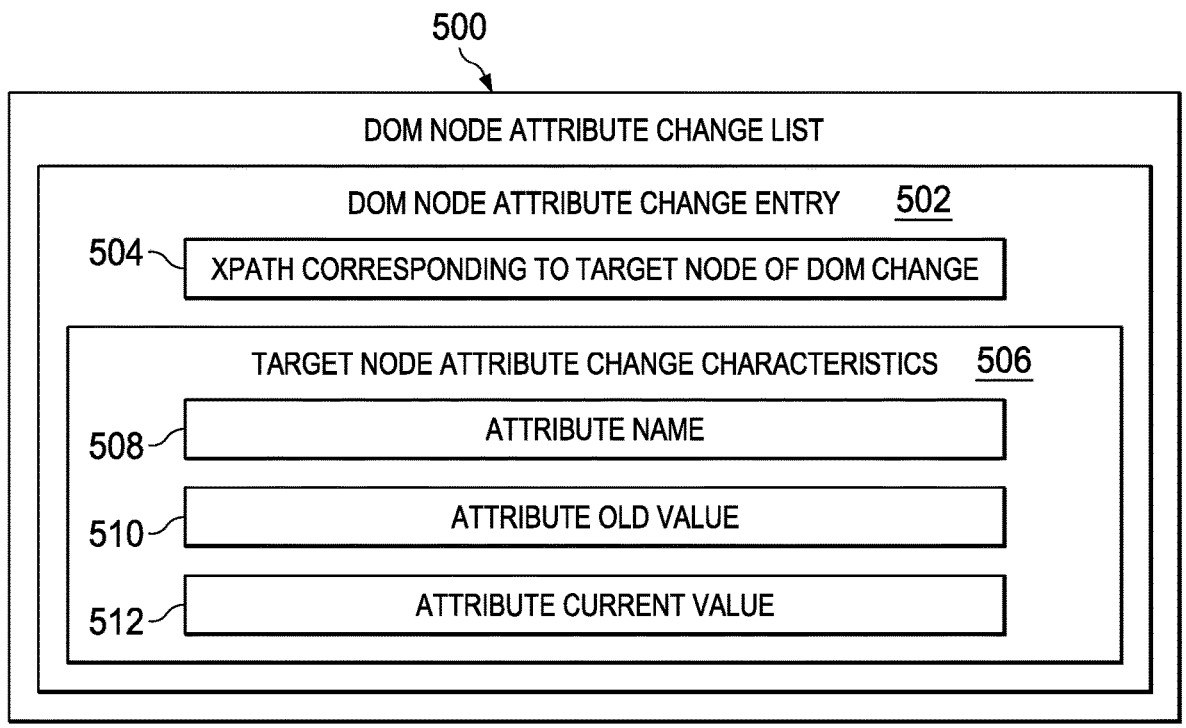
FIG. 5 is a diagram illustrating an example of a DOM node attribute change list in accordance with an illustrative embodiment.

With reference now to FIG. 5, a diagram illustrating an example of a DOM node attribute change list is depicted in accordance with an illustrative embodiment. DOM node attribute change list 500 may be, for example, DOM node attribute change list 236 in FIG. 2. DOM node attribute change list 500 includes DOM node attribute change entry 502. It should be noted that DOM node attribute change entry 502 represents a plurality of DOM node attribute change entries in DOM node attribute change list 500.

DOM node attribute change entry 502 includes XPath corresponding to target node of DOM change 504 and target node attribute change characteristics 506. XPath corresponding to target node of DOM change 504 identifies the unique XPath corresponding to the DOM node that is the target of the attribute change to the base DOM. Target node attribute change characteristics 506 represent a set of one or more attribute changes to the target node. Target node attribute change characteristics 506 include attribute name 508, attribute old value 510, and attribute current value 512. Attribute name 508 identifies the name of the attribute that was changed in the target node. Attribute old value 510 identifies the old value of the attribute that was changed in the target node. Attribute current value 512 identifies the current value of the attribute as a result of the change to the target node.

Figure 6A:
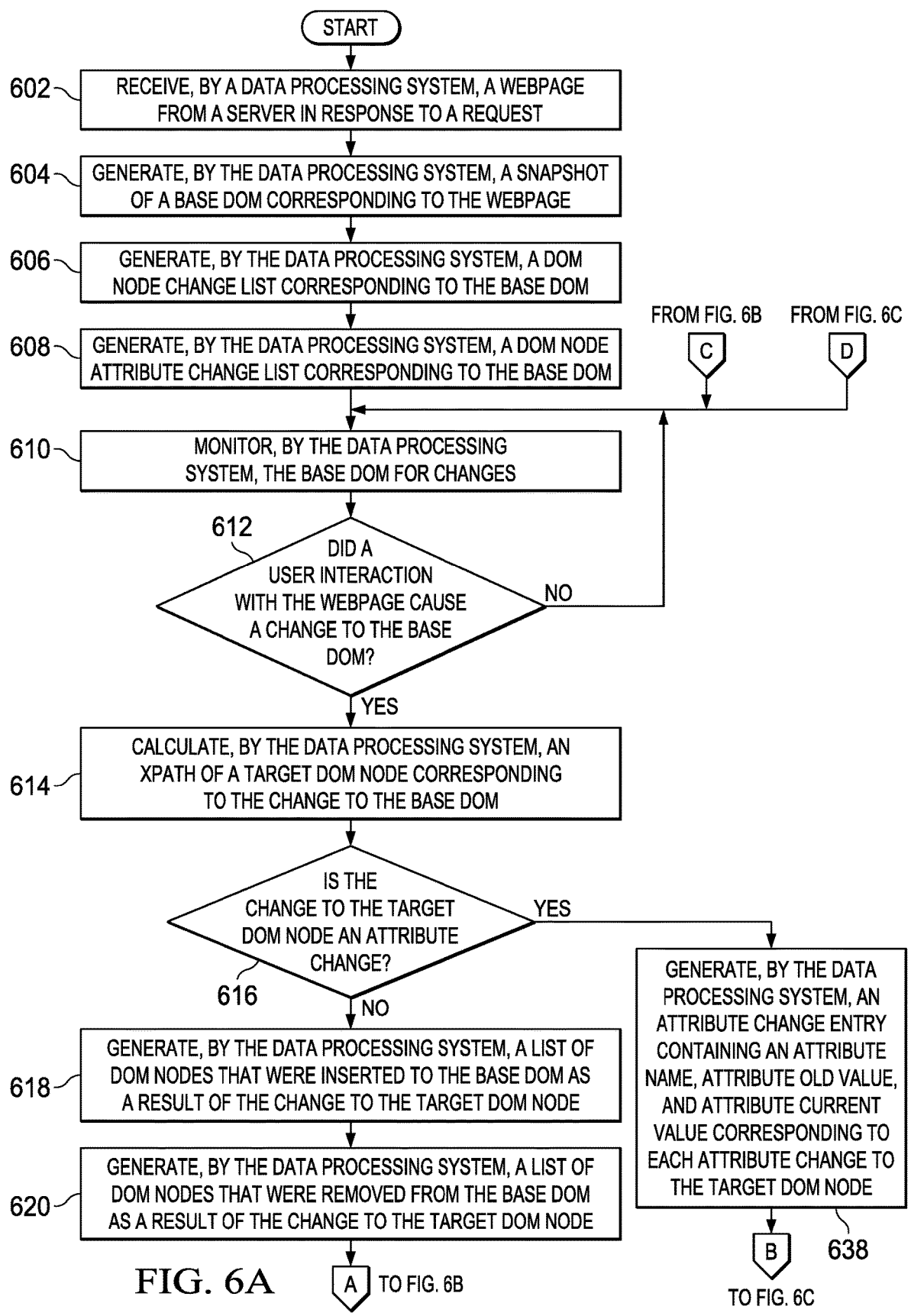
FIGS. 6A-6C are a flowchart illustrating a process for generating DOM node and attribute change lists in accordance with an illustrative embodiment.
Figure 6B:
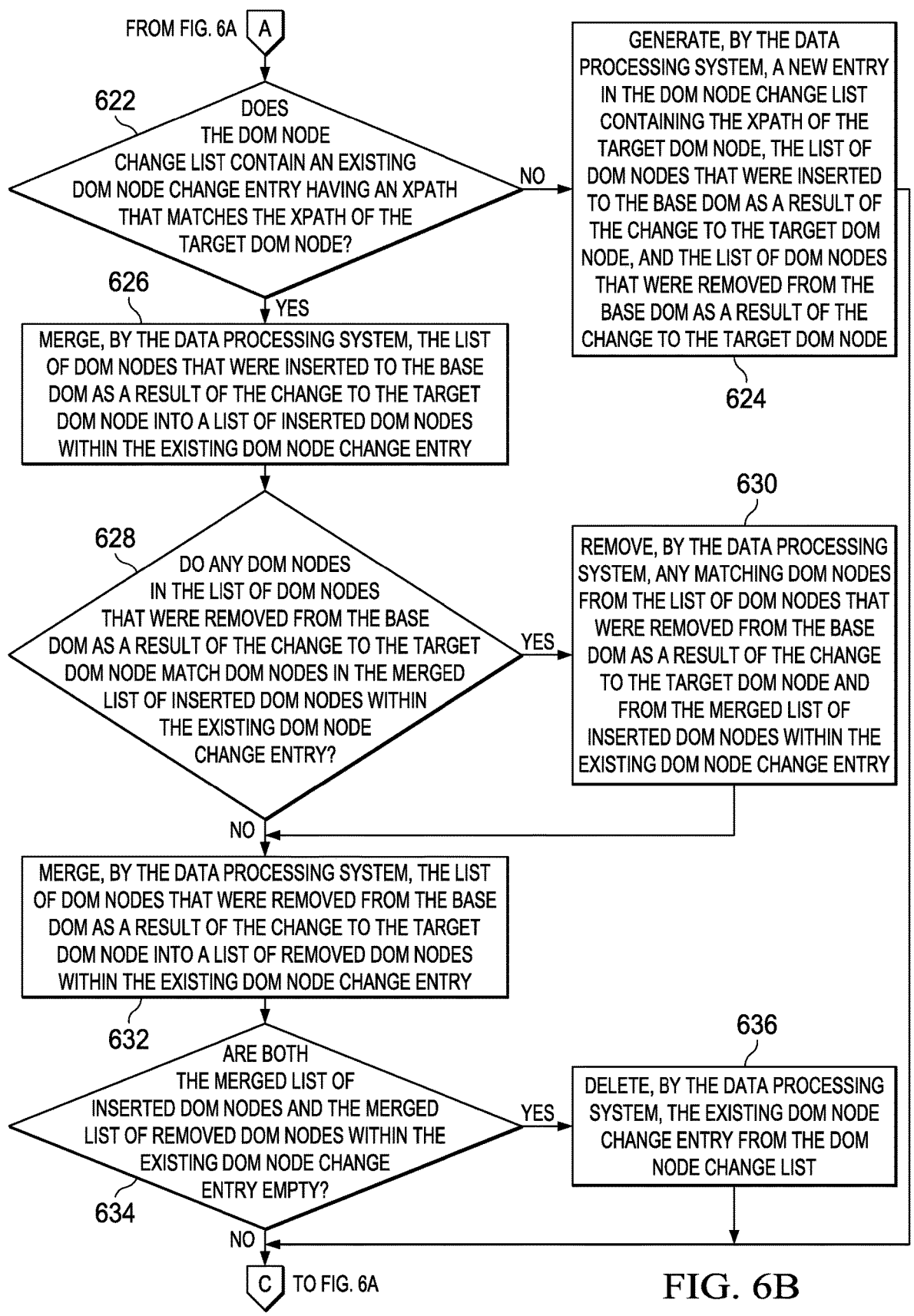
Figure 6C:
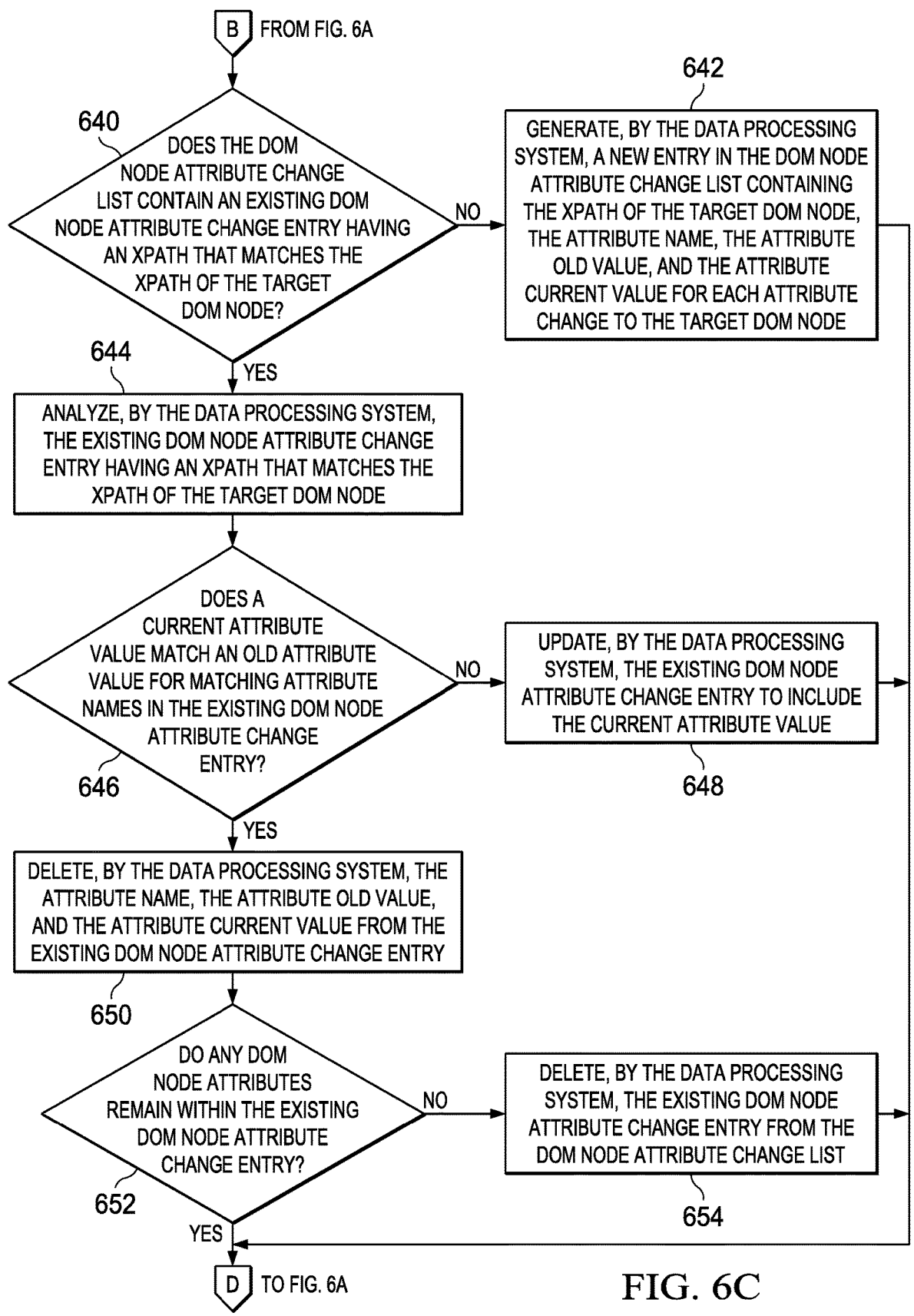

With reference now to FIGS. 6A-6C, a flowchart illustrating a process for generating DOM node and attribute change lists is shown in accordance with an illustrative embodiment. The process shown in FIGS. 6A-6C may be implemented in a data processing system, such as, for example, client 110 in FIG. 1 and data processing system 200 in FIG. 2.

The process begins when the data processing receives a webpage from a server in response to a request (step 602). The webpage may be, for example, webpage 224 in FIG. 2. The server may be, for example, server 104 in FIG. 1. After receiving the webpage in step 602, the data processing system generates a snapshot of a base DOM corresponding to the webpage (step 604). The snapshot of the base DOM corresponding to the webpage may be, for example, webpage base DOM snapshot 228 in FIG. 2.

In addition, the data processing system generates a DOM node change list corresponding to the base DOM (step 606). The DOM node change list may be, for example, DOM node change list 400 in FIG. 4. Further, the data processing system generates a DOM node attribute change list corresponding to the base DOM (step 608). The DOM node attribute change list may be, for example, DOM node attribute change list 500 in FIG. 5.

Furthermore, the data processing system monitors the base DOM for changes (step 610). In response to the data processing system monitoring the base DOM for changes in step 610, the data processing system makes a determination as to whether a user interaction with the webpage caused a change to the base DOM (step 612). If the data processing system determines that no changes to the base DOM have occurred, no output of step 612, then the process returns to step 610 where the data processing system continues to monitor the base DOM for changes. If the data processing system determines that a user interaction with the webpage caused a change to the base DOM, yes output of step 612, then the data processing system calculates an XPath of a target DOM node corresponding to the change to the base DOM (step 614). The XPath of the DOM target node may be, for example, XPath corresponding to target node of DOM change 404 in FIG. 4 or XPath corresponding to target node of DOM change 504 in FIG. 5.

The data processing system also makes a determination as to whether the change to the target DOM node is an attribute change (step 616). If the data processing system determines that the change to the target DOM node is not an attribute change, no output of step 616, then the data processing system generates a list of DOM nodes that were inserted to the base DOM as a result of the change to the target DOM node (step 618). The list of DOM nodes that were inserted to the base DOM as a result of the change to the target DOM node may be, for example, list of inserted DOM nodes corresponding to DOM change 314 in FIG. 3. In addition, the data processing system generates a list of DOM nodes that were removed from the base DOM as a result of the change to the target DOM node (step 620). The list of DOM nodes that were removed from the base DOM as a result of the change to the target DOM node may be, for example, list of removed DOM nodes corresponding to DOM change 316 in FIG. 3.

Afterward, the data processing system makes a determination as to whether the DOM node change list contains an existing DOM node change entry having an XPath that matches the XPath of the target DOM node (step 622). If the data processing system determines that the DOM node change list does not contain an existing DOM node change entry having an XPath that matches the XPath of the target DOM node, no output of step 622, then the data processing system generates a new entry in the DOM node change list containing the XPath of the target DOM node, the list of DOM nodes that were inserted to the base DOM as a result of the change to the target DOM node, and the list of DOM nodes that were removed from the base DOM as a result of the change to the target DOM node (step 624). Thereafter, the process returns to step 610 where the data processing system continues to monitor the base DOM for changes. If the data processing system determines that the DOM node change list does contain an existing DOM node change entry having an XPath that matches the XPath of the target DOM node, yes output of step 622, then the data processing system merges the list of DOM nodes that were inserted to the base DOM as a result of the change to the target DOM node into a list of inserted DOM nodes within the existing DOM node change entry (step 626).

Further, the data processing system makes a determination as to whether any DOM nodes in the list of DOM nodes that were removed from the base DOM as a result of the change to the target DOM node match DOM nodes in the merged list of inserted DOM nodes within the existing DOM node change entry (step 628). If the data processing system determines that DOM nodes in the list of DOM nodes that were removed from the base DOM as a result of the change to the target DOM node do match DOM nodes in the merged list of inserted DOM nodes within the existing DOM node change entry, yes output of step 628, then the data processing system removes any matching DOM nodes from the list of DOM nodes that were removed from the base DOM as a result of the change to the target DOM node and from the merged list of inserted DOM nodes within the existing DOM node change entry (step 630). Thereafter, the process proceeds to step 632. If the data processing system determines that no DOM nodes in the list of DOM nodes that were removed from the base DOM as a result of the change to the target DOM node match DOM nodes in the merged list of inserted DOM nodes within the existing DOM node change entry, no output of step 628, then the data processing system merges the list of DOM nodes that were removed from the base DOM as a result of the change to the target DOM node into a list of removed DOM nodes within the existing DOM node change entry (step 632).

Subsequently, the data processing system makes a determination as to whether both the merged list of inserted DOM nodes and the merged list of removed DOM nodes within the existing DOM node change entry are empty (step 634). If the data processing system determines that both the merged list of inserted DOM nodes and the merged list of removed DOM nodes within the existing DOM node change entry are not empty, no output of step 634, then the process returns to step 610 where the data processing system continues to monitor the base DOM for changes. If the data processing system determines that both the merged list of inserted DOM nodes and the merged list of removed DOM nodes within the existing DOM node change entry are empty, yes output of step 634, then the data processing system deletes the existing DOM node change entry from the DOM node change list (step 636). Thereafter, the process returns to step 610 where the data processing system continues to monitor the base DOM for changes.

Returning again to step 616, if the data processing system determines that the change to the target DOM node is an attribute change, yes output of step 616, then the data processing system generates an attribute change entry containing an attribute name, attribute old value, and attribute current value corresponding to each attribute change to the target DOM node (step 638). The attribute change entry may be, for example, DOM node attribute change entry 502 in FIG. 5 containing attribute name 508, attribute old value 510, and attribute current value 512. Furthermore, the data processing system makes a determination as to whether the DOM node attribute change list contains an existing DOM node attribute change entry having an XPath that matches the XPath of the target DOM node (step 640).

If the data processing system determines that the DOM node attribute change list does not contain an existing DOM node attribute change entry having an XPath that matches the XPath of the target DOM node, no output of step 640, then the data processing system generates a new entry in the DOM node attribute change list containing the XPath of the target DOM node, the attribute name, the attribute old value, and the attribute current value for each attribute change to the target DOM node (step 642). Thereafter, the process returns to step 610 where the data processing system continues to monitor the base DOM for changes. If the data processing system determines that the DOM node attribute change list does contain an existing DOM node attribute change entry having an XPath that matches the XPath of the target DOM node, yes output of step 640, then the data processing system analyzes the existing DOM node attribute change entry having an XPath that matches the XPath of the target DOM node (step 644).

Subsequently, the data processing system makes a determination as to whether a current attribute value matches an old attribute value for matching attribute names in the existing DOM node attribute change entry (step 646). If the data processing system determines that a current attribute value does not match an old attribute value for matching attribute names in the existing DOM node attribute change entry, no output of step 646, then the data processing system updates the existing DOM node attribute change entry to include the current attribute value (step 648). Thereafter, the process returns to step 610 where the data processing system continues to monitor the base DOM for changes. If the data processing system determines that a current attribute value does match the old attribute value for matching attribute names in the existing DOM node attribute change entry, yes output of step 646, then the data processing system deletes the attribute name, the attribute old value, and the attribute current value from the existing DOM node attribute change entry (step 650).

Afterward, the data processing system makes a determination as to whether any DOM node attributes remain within the existing DOM node attribute change entry (step 652). If the data processing system determines that no DOM node attributes remain within the existing DOM node attribute change entry, no output of step 652, then the data processing system deletes the existing DOM node attribute change entry from the DOM node attribute change list (step 654). Thereafter, the process returns to step 610 where the data processing system continues to monitor the base DOM for changes. If the data processing system determines that DOM node attributes remain within the existing DOM node attribute change entry, yes output of step 652, then the process returns to step 610 where the data processing system continues to monitor the base DOM for changes.

Figure 7:
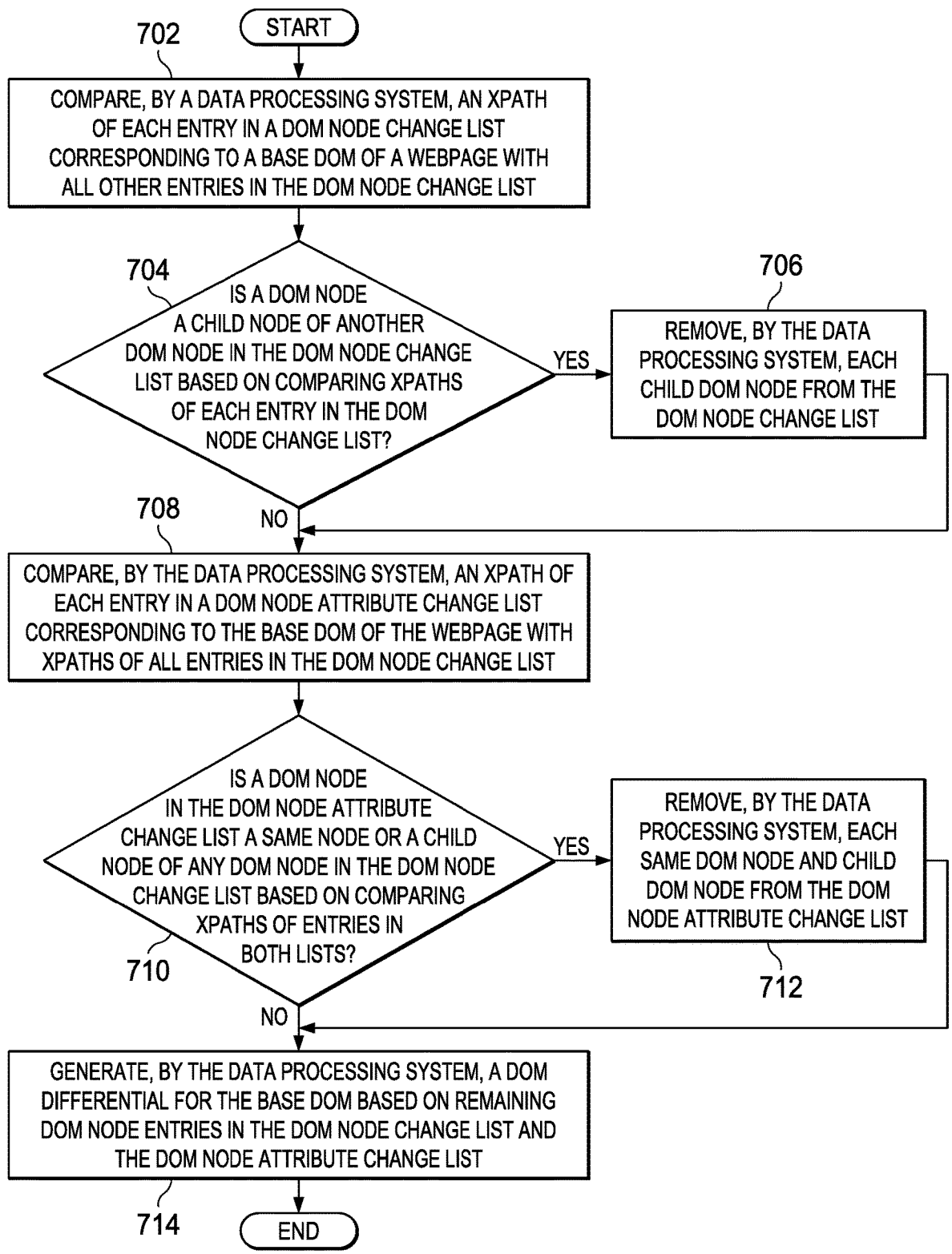
FIG. 7 is a flowchart illustrating a process for generating a DOM differential in accordance with an illustrative embodiment.

With reference now to FIG. 7, a flowchart illustrating a process for generating a DOM differential is shown in accordance with an illustrative embodiment. The process shown in FIG. 7 may be implemented in a data processing system, such as, for example, client 110 in FIG. 1 and data processing system 200 in FIG. 2.

The process begins when the data processing system compares an XPath of each entry in a DOM node change list corresponding to a base DOM of a webpage with all other entries in the DOM node change list (step 702). Afterward, the data processing system makes a determination as to whether a DOM node is a child node of another DOM node in the DOM node change list based on comparing XPaths of each entry in the DOM node change list (step 704). If the data processing system determines that a DOM node is a child node of another DOM node in the DOM node change list based on comparing XPaths of each entry in the DOM node change list, yes output of step 704, then the data processing system removes each child DOM node from the DOM node change list (step 706). Thereafter, the process proceeds to step 708.

If the data processing system determines that no DOM node is a child node of another DOM node in the DOM node change list based on comparing XPaths of each entry in the DOM node change list, no output of step 704, then the data processing system compares an XPath of each entry in a DOM node attribute change list corresponding to the base DOM of the webpage with XPaths of all entries in the DOM node change list (step 708). Subsequently, the data processing system makes a determination as to whether a DOM node in the DOM node attribute change list is a same node or a child node of any DOM node in the DOM node change list based on comparing XPaths of entries in both lists (step 710). If the data processing system determines that a DOM node in the DOM node attribute change list is a same node or a child node of any DOM node in the DOM node change list based on comparing XPaths of entries in both lists, yes output of step 710, then the data processing system removes each same DOM node and each child DOM node from the DOM node attribute change list (step 712). Thereafter, the process proceeds to step 714.

If the data processing system determines that no DOM node in the DOM node attribute change list is a same node or a child node of any DOM node in the DOM node change list based on comparing XPaths of entries in both lists, no output of step 710, then the data processing system generates a DOM differential for the base DOM based on remaining DOM node entries in the DOM node change list and the DOM node attribute change list (step 714). Thereafter, the process terminates.

Thus, illustrative embodiments of the present invention provide a computer-implemented method, data processing system, and computer program product for generating a DOM differential of a base DOM corresponding to the webpage based on user interactions with the webpage. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
    generating, by a data processing system, a snapshot of a base DOM corresponding to a received webpage;

monitoring, by the data processing system, the base DOM for changes;

generating, by the data processing system, a DOM differential for the base DOM based on DOM node entries in a DOM node change list corresponding to the base DOM, wherein the DOM differential includes a consolidated set of changes to the base DOM generated using a minimal set of changes from the DOM node change list;

determining, by the data processing system, that the DOM node change list does not contain an existing DOM node change entry having an XPath that matches an XPath of a target DOM node; and responsive to the determination, generating, by the data processing system, a new entry in the DOM node change list containing the XPath of the target DOM node, a list of DOM nodes that were inserted into the base DOM as a result of a change to the target DOM node, and a list of DOM nodes that were removed from the base DOM as a result of the change to the target DOM node.

2. The computer-implemented method of claim 1 further comprising:

responsive to the data processing system determining that a user interaction with the webpage caused a change to the base DOM, calculating, by the data processing system, the XPath of the target DOM node corresponding to the change to the base DOM.

3. The computer-implemented method of claim 2 further comprising:

responsive to the data processing system determining that the change to the target DOM node is not an attribute change, generating, by the data processing system, a list of DOM nodes that were inserted to the base DOM as a result of the change to the target DOM node and generating, by the data processing system, a list of DOM nodes that were removed from the base DOM as a result of the change to the target DOM node.

4. The computer-implemented method of claim 2 further comprising:

responsive to the data processing system determining that the change to the target DOM node is an attribute change, generating, by the data processing system, an attribute change entry in a DOM node attribute change list containing an attribute name, attribute old value, and attribute current value corresponding to each attribute change to the target DOM node.

5. The computer-implemented method of claim 1 further comprising:

responsive to the data processing system determining that both a merged list of inserted DOM nodes and a merged list of removed DOM nodes within the existing DOM node change entry are empty, deleting, by the data processing system, the existing DOM node change entry from the DOM node change list.

6. The computer-implemented method of claim 4 further comprising:

determining, by the data processing system, whether the DOM node attribute change list contains an existing DOM node attribute change entry having an XPath that matches the XPath of a target DOM node;

responsive to the data processing system determining that the DOM node attribute change list does not contain an existing DOM node attribute change entry having an XPath that matches an XPath of a target DOM node, generating, by the data processing system, a new entry in the DOM node attribute change list containing the XPath of the target DOM node, an attribute name, an attribute old value, and an attribute current value for each attribute change to the target DOM node; and responsive to the data processing system determining that the DOM node attribute change list does contain an existing DOM node attribute change entry having an XPath that matches an XPath of a target DOM node, analyzing, by the data processing system, the existing DOM node attribute change entry having the XPath that matches the XPath of the target DOM node.

7. The computer-implemented method of claim 6 further comprising:

determining, by the data processing system, whether the current attribute value matches the old attribute value for matching attribute names in the existing DOM node attribute change entry;

responsive to the data processing system determining that the current attribute value does not match the old attribute value for matching attribute names in the existing DOM node attribute change entry, updating, by the data processing system, the existing DOM node attribute change entry to include the current attribute value; and responsive to the data processing system determining that the current attribute value does match the old attribute value for matching attribute names in the existing DOM node attribute change entry, deleting, by the data processing system, the attribute name, the attribute old value, and the attribute current value from the existing DOM node attribute change entry.

8. The computer-implemented method of claim 7 further comprising:

responsive to the data processing system determining that no DOM node attributes remain within the existing DOM node attribute change entry, deleting, by the data processing system, the existing DOM node attribute change entry from the DOM node attribute change list.

9. The computer-implemented method of claim 1 further comprising:

comparing, by the data processing system, an XPath of each entry in the DOM node change list corresponding to the base DOM of the webpage with all other entries in the DOM node change list.

10. The computer-implemented method of claim 9 further comprising:

determining, by the data processing system, whether a DOM node is a child node of another DOM node in the DOM node change list based on comparing XPaths of each entry in the DOM node change list;

responsive to the data processing system determining that a DOM node is a child node of another DOM node in the DOM node change list based on comparing XPaths of each entry in the DOM node change list, removing, by the data processing system, each child DOM node from the DOM node change list; and responsive to the data processing system determining that no DOM node is a child node of another DOM node in the DOM node change list based on comparing XPaths of each entry in the DOM node change list, comparing, by the data processing system, an XPath of each entry in a DOM node attribute change list corresponding to the base DOM of the webpage with XPaths of all entries in the DOM node change list.

11. The computer-implemented method of claim 10 further comprising:

determining, by the data processing system, whether a DOM node in the DOM node attribute change list is a same node or a child node of any DOM node in the DOM node change list based on comparing XPaths of entries in both lists;

responsive to the data processing system determining that a DOM node in the DOM node attribute change list is a same node or a child node of any DOM node in the DOM node change list based on comparing XPaths of entries in both lists, removing, by the data processing system, each same DOM node and each child DOM node from the DOM node attribute change list; and responsive to the data processing system determining that no DOM node in the DOM node attribute change list is a same node or a child node of any DOM node in the DOM node change list based on comparing XPaths of entries in both lists, generating, by the data processing system, the DOM differential for the base DOM based on remaining DOM node entries in the DOM node change list and the DOM node attribute change list.

12. A data processing system comprising:
a bus system;
a storage device connected to the bus system, wherein the storage device stores program instructions; and
a processor connected to the bus system, wherein the processor executes the program instructions to:
generate a snapshot of a base DOM corresponding to a received webpage;
monitor the base DOM for changes;
generate a DOM differential for the base DOM based on DOM node entries in a DOM node change list corresponding to the base DOM, wherein the DOM differential includes a consolidated set of changes to the base DOM generated using a minimal set of changes from the DOM node change list;
determine that the DOM node change list does not contain an existing DOM node change entry having an XPath that matches an XPath of a target DOM node; and
responsive to the determination, generate a new entry in the DOM node change list containing the XPath of the target DOM node, a list of DOM nodes that were inserted into the base DOM as a result of a change to the target DOM node, and a list of DOM nodes that were removed from the base DOM as a result of the change to the target DOM node.

13. The data processing system of claim 12, wherein the processor further executes the program instructions to:
calculate the XPath of the target DOM node corresponding to a change to the base DOM in response to determining that a user interaction with the webpage caused the change to the base DOM.

14. A computer program product comprising a non-transitory computer readable storage medium having program instructions embodied therewith, the program instructions executable by a data processing system to cause the data processing system to perform a method comprising:
generating, by a data processing system, a snapshot of a base DOM corresponding to a received webpage;
monitoring, by the data processing system, the base DOM for changes;
generating, by the data processing system, a DOM differential for the base DOM based on DOM node entries in a DOM node change list corresponding to the base DOM, wherein the DOM differential includes a consolidated set of changes to the base DOM generated using a minimal set of changes from the DOM node change list;

determining, by the data processing system, that the DOM node change list does not contain an existing DOM node change entry having an XPath that matches an XPath of a target DOM node; and responsive to the determination, generating, by the data processing system, a new entry in the DOM node change list containing the XPath of the target DOM node, a list of DOM nodes that were inserted into the base DOM as a result of a change to the target DOM node, and a list of DOM nodes that were removed from the base DOM as a result of the change to the target DOM node.

15. The computer program product of claim 14 further comprising:
responsive to the data processing system determining that a user interaction with the webpage caused a change to the base DOM, calculating, by the data processing system, the XPath of the target DOM node corresponding to the change to the base DOM.

16. The computer program product of claim 15 further comprising:
responsive to the data processing system determining that the change to the target DOM node is not an attribute change, generating, by the data processing system, a list of DOM nodes that were inserted to the base DOM as a result of the change to the target DOM node and generating, by the data processing system, a list of DOM nodes that were removed from the base DOM as a result of the change to the target DOM node.

17. The computer program product of claim 15 further comprising:
responsive to the data processing system determining that the change to the target DOM node is an attribute change, generating, by the data processing system, an attribute change entry in a DOM node attribute change list containing an attribute name, attribute old value, and attribute current value corresponding to each attribute change to the target DOM node.

18. A computer-implemented method comprising:
generating, by a data processing system, a snapshot of a base DOM corresponding to a received webpage;
monitoring, by the data processing system, the base DOM for changes;
determining, by the data processing system, an XPath of a target DOM node corresponding to a change to the base DOM;
generating, by the data processing system, a DOM differential for the base DOM, wherein generating is based on DOM node entries in a DOM node change list corresponding to the base DOM, wherein the DOM differential includes a consolidated set of changes to the base DOM generated using a minimal set of changes from the DOM node change list;
determining, by the data processing system, that the DOM node change list does not contain an existing DOM node change entry having an XPath that matches an XPath of a target DOM node; and
responsive to the determination, generating, by the data processing system, a new entry in the DOM node change list containing the XPath of the target DOM node, a list of DOM nodes that were inserted into the base DOM as a result of a change to the target DOM node, and a list of DOM nodes that were removed from the base DOM as a result of the change to the target DOM node.

* * * * *